United States Patent
Todd

(10) Patent No.: US 9,686,373 B2
(45) Date of Patent: Jun. 20, 2017

(54) CONNECTION CACHE METHOD AND SYSTEM

(71) Applicant: OPENWAVE MOBILITY, INC., Redwood City, CA (US)

(72) Inventor: Darren Richard Todd, County Down (GB)

(73) Assignee: OPENWAVE MOBILITY, INC., Redwood City, CA (US)

( * ) Notice: Subject to any disclaimer, the term of this patent is extended or adjusted under 35 U.S.C. 154(b) by 350 days.

(21) Appl. No.: 14/263,980

(22) Filed: Apr. 28, 2014

(65) Prior Publication Data
US 2014/0237067 A1 Aug. 21, 2014

Related U.S. Application Data

(63) Continuation of application No. PCT/EP2012/071178, filed on Oct. 25, 2012.
(Continued)

(51) Int. Cl.
*G06F 15/167* (2006.01)
*H04L 29/08* (2006.01)
(Continued)

(52) U.S. Cl.
CPC ...... *H04L 67/2842* (2013.01); *G06F 11/3055* (2013.01); *H04L 43/0882* (2013.01);
(Continued)

(58) Field of Classification Search
CPC . H04L 67/14; H04L 67/2842; H04L 67/1031; H04L 43/0882; H04L 67/2852; H04L 29/08; G06F 11/3055
See application file for complete search history.

(56) References Cited

U.S. PATENT DOCUMENTS 6,606,645 B1 * 8/2003 Cohen ............... H04L 29/06
709/203
7,216,160 B2 * 5/2007 Chintalapati ....... G06F 11/3409
370/352
(Continued)

OTHER PUBLICATIONS

"Feldmann A et al: "Performance of Web proxy caching in heterogeneous bandwidth environments", INFOCOM '99. Eighteenth Annual Joint Conference of the IEEE Computer and Communications Societies. Proceedings. IEEE New York, NY, USA Mar. 21-25, 1999, Piscataway, NJ, USA, IEEE, US, vol. 1, Mar. 21, 1999 (Mar. 21, 1999), pp. 107-116, XP010323748, ISBN: 978-0-7803-5417-3".
(Continued)

*Primary Examiner* — Benjamin M Thieu
(74) *Attorney, Agent, or Firm* — EIP US LLP

(57) ABSTRACT

A method, apparatus and computer program product for maintaining a connection cache at an intermediate server, wherein the connection cache relating to resource requests from a plurality of devices to a plurality of servers remote therefrom. The method comprises monitoring resource requests addressed to a plurality of said remote servers during a first time period; generating statistics data on the basis of the monitored resource requests; establishing a plurality of connections from the intermediate server to a subset of the plurality of remote servers, said subset being determined on the basis of the generated statistics data; and storing data indicative of the plurality of established connections in a connection cache. Caching of connections in this manner ensures efficient use of proxy server resources by only caching connections to "popular" remote servers.

13 Claims, 9 Drawing Sheets

Related U.S. Application Data

(60) Provisional application No. 61/553,142, filed on Oct. 28, 2011.

(51) Int. Cl.
  *G06F 11/30* (2006.01)
  *H04L 12/26* (2006.01)

(52) U.S. Cl.
  CPC .......... *H04L 67/1031* (2013.01); *H04L 67/14* (2013.01); *H04L 67/2852* (2013.01)

(56) References Cited

U.S. PATENT DOCUMENTS

| | | | |
|---|---|---|---|
| 7,403,992 B2* | 7/2008 | Tilander | H04L 49/253 370/395.2 |
| 7,480,711 B2 | 1/2009 | Lownsbrough | |
| 2002/0071422 A1* | 6/2002 | Amicangioli | G06F 17/30902 370/351 |
| 2003/0200282 A1* | 10/2003 | Arnold | G06F 17/3048 709/219 |
| 2003/0204602 A1* | 10/2003 | Hudson | D01D 5/423 709/228 |
| 2004/0240386 A1 | 12/2004 | Irudayaraj | |
| 2006/0059265 A1* | 3/2006 | Keronen | H04L 29/06 709/228 |
| 2007/0136311 A1* | 6/2007 | Kasten | H04L 67/1008 |
| 2007/0266145 A1* | 11/2007 | Nesbitt | G06F 17/3089 709/224 |
| 2008/0250419 A1* | 10/2008 | Kasten | H04L 67/14 718/104 |
| 2009/0323670 A1* | 12/2009 | Altberg | G06Q 30/02 370/352 |
| 2011/0078318 A1* | 3/2011 | Desai | G06F 9/5083 709/228 |

OTHER PUBLICATIONS

James E. Pitkow, Margaret M. Recker: 'A Simple Vet Robust Caching Algorithm Based on Dynamic Access Patterns', A Proceedings of the Second International WWW Conference, 1994, XP002689641, US.

Sep. 1981 Transmission Control Protocol, DARPA Internet Program, Protocol Specification, Information Sciences Institute University of Southern California TCP RFC 793.

International Search Report issued for related application PCT/EP2012/071178 on Jan. 11, 2013.

* cited by examiner

| ENDPOINT (IP ADDRESS & PORT) | REQUEST RATE (REQUESTS / 24HR) |
|---|---|
| ENDPOINT #89 | 5,000 |
| ENDPOINT #62 | 4,000 |
| ENDPOINT #5 | 3,500 |
| ENDPOINT #27 | 3,300 |
| ENDPOINT #35 | 1,500 |
| ENDPOINT #29 | 100 |
| ENDPOINT #16 | 90 |
| | |
| | |
| | |
| | |

402 — ENDPOINT (IP ADDRESS & PORT)
404 — REQUEST RATE (REQUESTS / 24HR)
400 — (table)
R MOST POPULAR ENDPOINTS (brace covering ENDPOINT #89, #62, #5, #27)

FIGURE 4

| ENDPOINT | CONNECTION | STATUS | CLIENT |
|---|---|---|---|
| ENDPOINT #89 | 57A0C | ACTIVE | CLIENT #46 |
| ENDPOINT #89 | 003BC | ACTIVE | CLIENT #22 |
| ENDPOINT #89 | 77AAA | ACTIVE | CLIENT #01 |
| ENDPOINT #89 | 55555 | ACTIVE | CLIENT #88 |
| ENDPOINT #89 | ABCD1 | ACTIVE | CLIENT #17 |
| ENDPOINT #89 | 12345 | INACTIVE | |
| ENDPOINT #89 | 54321 | INACTIVE | |
| ENDPOINT #89 | 1A1A1 | INACTIVE | |
| ENDPOINT #62 | ABBA1 | ACTIVE | CLIENT #22 |
| ENDPOINT #62 | 00001 | ACTIVE | CLIENT #39 |
| ENDPOINT #62 | 99987 | ACTIVE | CLIENT #104 |
| ENDPOINT #62 | 01102 | INACTIVE | |
| ENDPOINT #62 | ABC00 | INACTIVE | |
| ENDPOINT #5 | 11111 | ACTIVE | CLIENT #27 |
| ENDPOINT #5 | 22222 | ACTIVE | CLIENT #40 |
| ENDPOINT #5 | 33333 | ACTIVE | CLIENT #99 |

FIGURE 5

CONNECTION CACHE METHOD AND SYSTEM

CROSS-REFERENCE TO RELATED APPLICATIONS

This application is a continuation under 35 U.S.C. §120 of International Application No. PCT/EP2012/071178, filed Oct. 25, 2012 (published by the International Bureau as International Publication No. WO2013060791 A1 on May 2, 2013), which claims priority to U.S. Provisional Patent Application No. 61/553,142, filed Oct. 28, 2011. The entire contents of each of the above-referenced applications are hereby incorporated by reference.

BACKGROUND OF THE INVENTION

Field of the Invention

The present application relates to maintaining a connection cache in an intermediate server. More particularly, the application relates to maintaining a connection cache in an intermediate server on the basis of statistics associated with monitored resource requests.

Description of the Related Technology

The term "proxy server" can be used to refer to a server that acts as an intermediary for requests received from a plurality of client devices and addressed to one or more remote servers. Typically, such requests are requests for resources (e.g. Web pages or multimedia files) or services which are stored at or accessed via the one or more remote servers. In this context, a remote server may be considered to be an endpoint in relation to a request for a network resource and is generally identified by a network address (e.g. an Internet Protocol (IP) or domain address) and a port number. For example, a proxy server may receive a Hypertext Transfer Protocol (HTTP) request over a Transmission Control Protocol (TCP) connection from a client device, and in turn open a new TCP connection to the endpoint identified in the HTTP request to thereby enable the HTTP request to be forwarded (i.e. proxied) to its destination.

Typically, the opening of a new TCP connection from the proxy server to the endpoint is achieved using a standard TCP three-way handshake mechanism (c.f. http://www.faqs.org/rfcs/rfc793.html section 2.7) and can be costly in terms of setup time. To illustrate, the round trip time (RTT) of a TCP packet sent between a proxy server and an endpoint can be several hundred milliseconds, and three round trips are required to establish a TCP connection. Moreover, in cases where a new TCP connection is opened for each HTTP transaction, data throughput rates may be initially low due to the use of congestion control strategies. For example, where "slow start" algorithms are employed, the congestion window size (i.e. the amount of data that may be in flight over the TCP connection) is initially small, which limits the throughput of the newly opened TCP connection.

In response to these problems, techniques for caching TCP connections have been proposed in the following documents, which are incorporated by reference herein: (i) A. Feldmann et al., "Performance of Web Proxy Caching in Heterogeneous Bandwidth Environments," Proc. of the IEEE, INFOCOM '99 Conference (1999); and (ii) Lownsbrough et al., "System and method for efficiently forwarding client requests in a TCP/IP computing environment," U.S. Pat. No. 7,480,711 B2, issued Jan. 20, 2009.

SUMMARY

According to a first exemplary embodiment, there is provided a method of maintaining a connection cache at an intermediate server, the connection cache relating to resource requests from a plurality of devices to a plurality of servers remote therefrom, the method may comprise monitoring resource requests addressed to a plurality of said remote servers during a first time period; generating statistics data on the basis of the monitored resource requests; establishing a plurality of connections from the intermediate server to a subset of the plurality of remote servers, said subset may be determined on the basis of the generated statistics data; and storing data indicative of the plurality of established connections in a connection cache.

Thus, this exemplary embodiment maintains connections in a connection cache on the basis of statistics, such that connections to remote servers associated with frequently requested resources are cached in preference to connections to remote servers associated with infrequently requested resources. In this manner, the exemplary embodiment provides efficient use of processing and memory resources at the intermediate server.

The method may further comprise receiving a further resource request addressed to a particular remote server of the plurality of remote servers; identifying, from the connection cache, data corresponding to the further resource request; and utilizing whichever established connection corresponds to the identified data to forward the further resource request to the particular remote server. Thus, resource requests associated with frequently requested resources are completed using a connection from the connection cache. Use of a cached connection reduces the latency involved in responding to the resource request.

Once the transaction being serviced by the utilized connection has been completed and the connection is no longer required, it is necessary to update the connection cache accordingly. In some embodiments, responsive to receipt of a termination request in respect of the utilized connection, data corresponding to the utilized connection in the connection cache is modified appropriately. If the termination request is received from a device associated with the utilized connection, the data corresponding to the utilized connection is modified to indicate that the utilized connection is available for further resource requests. Conversely, if the termination request is received from a remote server associated with the utilized connection, the data corresponding to the utilized connection is modified to indicate that the utilized connection has been closed. Thus, it is apparent that the manner by which the connection cache is modified differs depending on the origin of the termination request.

Typically, the most popular remote servers will change overtime. Accordingly, in some embodiments, the method further may comprise monitoring resource requests addressed to the plurality of remote servers during a second time period; updating the statistics data on the basis of the resource requests monitored during the second time period; closing a plurality of connections from the intermediate server to a subset of the plurality of remote servers, the subset being determined on the basis of the generated statistics data; and modifying data indicative of the plurality of closed connections in the connection cache. This ensures that the connections maintained in the connection cache continue to relate to popular remote servers, thereby ensuring that efficient use of the intermediate servers is continued over time.

The connection cache itself typically may comprise a data structure which indicates a plurality of established connections from the intermediate server to the plurality of remote servers and a plurality of respective status indicators. The status indicator for a particular connection generally indicates whether the connection is available for use (i.e. inactive) or unavailable for use (i.e. active). This enables the efficient management of the connection cache with minimal resource overhead.

In order to determine the popular remote servers for which to maintain connections in the connection cache, the statistics data preferably indicates a ranking of said plurality of remote servers based on number or rate of connection requests in respect thereof, and said subset of remote servers is selected on the basis of the ranking. This provides an efficient measure of remote server popularity and can be utilized to monitor changes in popularity over time, thereby ensuring efficient use of the intermediate server's resources.

Typically, the resource requests received by the intermediate servers are Hypertext Transfer Protocol (HTTP) requests. However, the resource requests may additionally relate to other protocols such as Post Office Protocol (POP), Simple Mail Transfer Protocol (SMTP), File Transfer Protocol (FTP) or a mix thereof. Thus, the exemplary embodiment is applicable to a large number of application level protocols and has broad application.

According to a second exemplary embodiment, there is provided an intermediate server for maintaining a connection cache, the connection cache relating to resource requests from a plurality of devices to a plurality of servers remote therefrom, the intermediate server may comprise a processor configured to: monitor resource requests received addressed to a plurality of said remote servers during a first time period; generate statistics data on the basis of the monitored resource requests; establish a plurality of connections from the intermediate server to a subset of the plurality of remote servers, said subset being determined on the basis of the generated statistics data; and store data indicative of the plurality of established connections in a connection cache.

According to a third exemplary embodiment, there is provided a non-transitory computer-readable storage medium having computer readable instructions stored thereon, the computer readable instructions may be executable by a computerized device to cause the computerized device to perform a method of maintaining a connection cache at an intermediate server, the connection cache relating to resource requests from a plurality of devices to a plurality of servers remote therefrom, the method may comprise monitoring resource requests addressed to a plurality of said remote servers during a first time period; generating statistics data on the basis of the monitored resource requests; establishing a plurality of connections from the intermediate server to a subset of the plurality of remote servers, said subset may be determined on the basis of the generated statistics data; and storing data indicative of the plurality of established connections in a connection cache.

Further features and advantages of the invention will become apparent from the following description of preferred embodiments of the invention, given by way of example only, which is made with reference to the accompanying drawings.

BRIEF DESCRIPTION OF THE DRAWINGS

FIG. 4 is a schematic diagram showing statistics generated by a proxy server according to an embodiment of the invention.

FIG. 5 is a schematic diagram showing a connection cache according to an embodiment of the invention.

DETAILED DESCRIPTION OF CERTAIN INVENTIVE EMBODIMENTS

As described herein, an intermediate server referred to as a "proxy server" typically receives resource requests (e.g. HTTP requests) associated with a very large number of endpoints. It is impractical for a given proxy server to simultaneously maintain a cache of persistent connections (e.g., TCP connections) to all of the endpoints to which the proxy server could potentially be required to forward a resource request, as each connection has a cost in terms of resource usage (e.g. CPU utilization, memory usage etc.).

Embodiments of the invention provide a proxy server which generates statistics on the basis of monitored resource requests, and maintains a cache of connections to the most popular endpoints. The cached connections are used to "service" subsequent requests for resources addressed to endpoints for which a suitable connection exists in the connection cache. Caching of connections in this manner ensures efficient use of proxy server resources by only caching connections to "popular" endpoints. In this context, a "cached connection" is understood to mean an open (i.e. established) connection between the proxy server and an endpoint, which is available to client devices requesting resources from the associated origin server.

As resource requests are received at the proxy server, the proxy server generates a mapping of endpoint and the respective frequency of received resource requests. Typically, the mapping is presented as a histogram and the proxy server selects the top R endpoints (e.g. based on volume of access requests) as a subset of endpoints to which to establish and maintain connections for use in the connection cache. Periodically, the proxy server refreshes the connection cache on the basis of updated statistics generated on the basis of subsequence resource requests received at the proxy server. For example, the connection cache may be refreshed by the addition of new cached connections for endpoints that move into the top R most popular endpoints, and removal of existing cached connections to endpoints that move out of the top R most popular endpoints.

When a resource request associated with an endpoint for which the proxy server has an available cached connection is received at the proxy server, the proxy server utilizes that cached connection to forward the resource request to its destination and complete the associated transaction (e.g. an HTTP transaction). Whilst the transaction is in progress, the status associated with cached connection is updated to indicate that the connection is in use and unavailable for forwarding of further resource requests. However, once the transaction associated with the resource request has been completed, the proxy server updates the status to indicate that the associated cached connection is now available for servicing of subsequent resource requests, thereby in effect placing the connection back into the "pool" of available cached connections in the connection cache.

Figure 1:
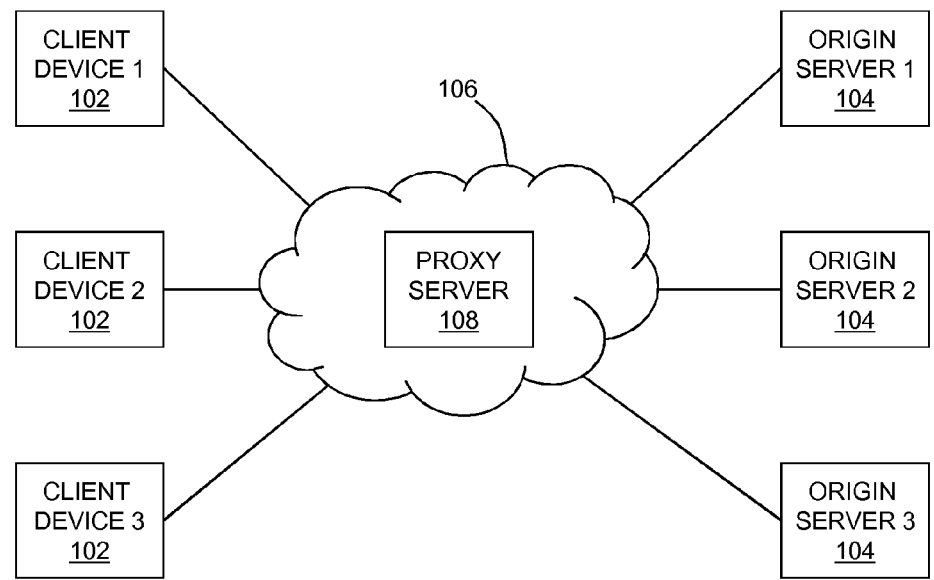
FIG. 1 is a schematic diagram showing a data network according to an embodiment of the invention.

FIG. 1 shows a system 100 according to an embodiment of the invention. The system 100 may comprise a plurality of client devices 102 which are operably connected to a plurality of origin servers 104 via a network 106 (e.g. the Internet). The network 106 includes a proxy server 108, which receives requests for resources (e.g. HTTP requests) from the client devices 102 to access resources located at or accessed via endpoints associated with the origin servers 104. In this respect, the proxy server 108 operates as an intermediate device in a non-transparent mode, whereby the client devices 102 are aware of the proxy server 108 and are configured to send resource requests via the proxy server 108. In further embodiments, the proxy server 108 may operate as an intermediate device in transparent mode in respect of interactions between the client devices 102 and the proxy server 108, and where the network 106 is configured to ensure that resource requests from the clients are routed via the proxy server 108.

Figure 2:
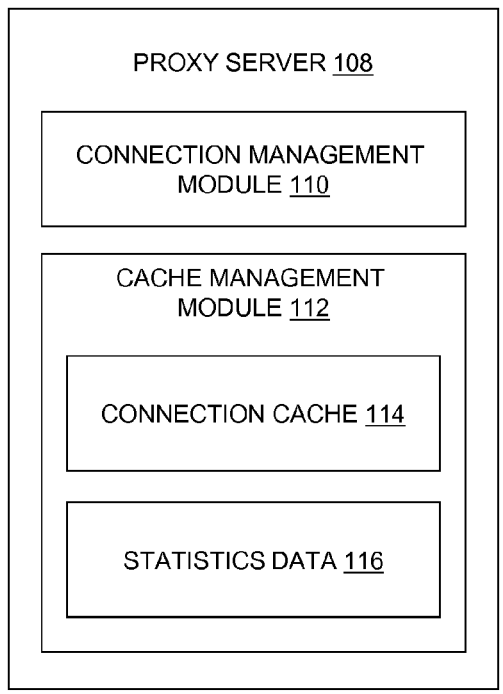
FIG. 2 is a schematic diagram showing a proxy server according to an embodiment of the invention.

With reference to FIG. 2, the proxy server 108 may comprise a connection management module 110 and a cache management module 112 which itself may comprise a connection cache 114 and statistics data 116. Typically, the connection management module 110 is a component of the operating system running on the proxy server 108 and provides the functionality for establishing (i.e. opening), managing and terminating (i.e. closing) connections between the proxy server 108 and other entities in network 106 (i.e. client devices 102 and origin servers 104).

The cache management module 112 is configured to cooperate with the connection management module 110 to monitor resource requests received at the proxy server 108 from the client devices 102. On the basis of this monitoring, the cache management module 112 generates statistics data 116, which in turn is used to maintain the connection cache 114. For example, the cache management module 112 may, on the basis of the statistics data 116, identify a plurality of popular endpoints (i.e. those endpoints associated with the origin servers to which a relatively large number of resource requests are addressed) and maintain the connection cache 114 such that it includes connections to the identified popular endpoints. In further embodiments, the connection cache 114 may comprise multiple connections to a given endpoint, thus endpoints which are relatively popular may be associated with proportionally more cached connections in the connection cache 114 that relatively less popular endpoints. The cache management module 112 updates the statistics data 116 and connection cache 114 on a periodic basis to maintain cached connections to the endpoints that are currently associated with most frequent resource requests.

Figure 3:
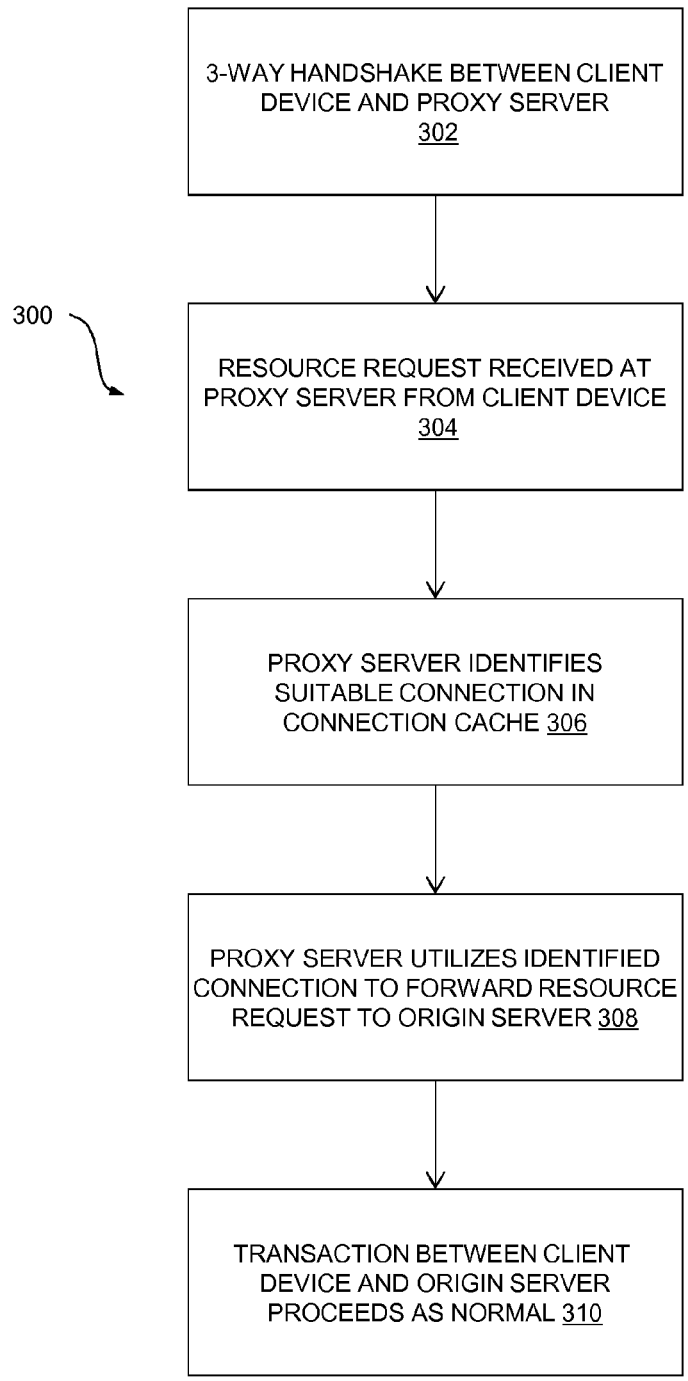
FIG. 3 is a flow chart showing a method of processing a resource request according to an embodiment of the invention.

FIG. 3 shows a method 300 for processing a resource requests received in accordance with a further embodiment. Specifically, the embodiment shown in FIG. 3 relates to HTTP resource requests which are carried over TCP. In a first step, a client device 102 performs a TCP 3-way handshake with the proxy server 108 to establish a client-proxy TCP connection [step 302]. Next, the client sends an HTTP resource requests over the client-proxy TCP connection, the HTTP resource request may be associated with a particular endpoint [step 304]. Upon receipt of the HTTP resource request, the cache management module 112 identifies a suitable connection in the connection cache 114 (i.e. an established connection from the proxy server 108 to the particular endpoint) [step 306]. Next, the proxy server 108 utilizes the identified connection to forward the HTTP resource request to the particular endpoint [step 308] and the HTTP transaction between the client device 102 and origin server 104 associated with the endpoint may proceed as normal [step 310].

FIG. 4 shows the statistics data 116 generated by the cache management module 112 according to an embodiment. The statistics data 116 may comprise a data structure 400 comprising endpoint data 402 (i.e. origin server IP address and port number) and request rate data 404. Typically, the endpoint data 402 is maintained for only those endpoints that receive a number of requests above a minimum threshold in a given time period. Alternatively or additionally, the endpoint data may be maintained for a group of origin servers or endpoints selected by an administrator. For each endpoint listed in the endpoint data 402, the data structure 400 includes respective request rate data 404 associated with a particular time period (e.g. 1 hour, 24 hours, 1 week etc.). In some embodiments, the preceding time period pertains to a rolling time frame.

As discussed above, the cache management module 112 uses the statistics data to determine popular endpoints for which cached connections should be opened or maintained. With reference to the data shown in FIG. 4, the cache management module 112 determines the R most popular endpoints on the basis of the request rate data 404. For example, if R is equal to 4, then endpoints 89, 62, 5, and 27 are identified as popular endpoints and are selected to have cached connections established or maintained in the connection cache 114. Of course, the endpoints that fall within the top R most popular servers can change over time. Additionally, the magnitude of R can be changed in response to various parameters.

Typically, the number of connections maintained in the connection cache 114 for a given endpoint will be proportion to that endpoint's respective request rate. Thus, with reference to the data shown in FIG. 4, endpoint #89 would have more connections in the connection cache 114 than endpoint #62, thereby further optimizing use of the proxy server's resources whilst simultaneously ensuring a good level of service to the requesting client devices 102.

As discussed above, in some embodiments the request rate data 404 is maintained only for those endpoints 402 that receive over a minimum number of resource requests per unit time. This threshold may be established on the basis of the resources available to the cache management module 112 (e.g., CPU time, memory availability, etc.). Establishing a minimum threshold relieves the proxy server 108 of tracking of requests to infrequently accessed endpoints. For example, if 80 percent of the resource requests correspond to the same five hundred endpoints and 20 percent of the requests correspond to fifty thousand other endpoints, then the minimum threshold can be set such that request rate data 404 is maintained for only the top five hundred endpoints. Maintaining data for only the top five hundred origin servers would cover 80% of resource requests and avoid the need to maintain request rate data 404 for the remaining 50,000 other origin servers.

FIG. 5 shows a connection cache for use with embodiments of the invention. The connection cache of FIG. 5 may comprise a data structure 500 comprising endpoint data 502, connection data 504, status data 506 and client data 508. Each row in the data structure 500 represents a single cached connection associated with a given endpoint. The connection data 504 is a unique identifier that identifies the connection in the operating system. For example, the connection data 504 may provide pointers to respective established connections in the connection management module 110. The status data 506 indicates whether a respective cached connection is in use (i.e. "active") or available for use (i.e. "inactive") and the client data 508 indicates the client (e.g. by IP address) utilizing those connections which are currently active. Thus, it will be appreciated that data structure 500 does not actually define the established connections, but instead provides and abstraction layer through which the caching of the established connections can be managed and monitored.

Figure 6A:
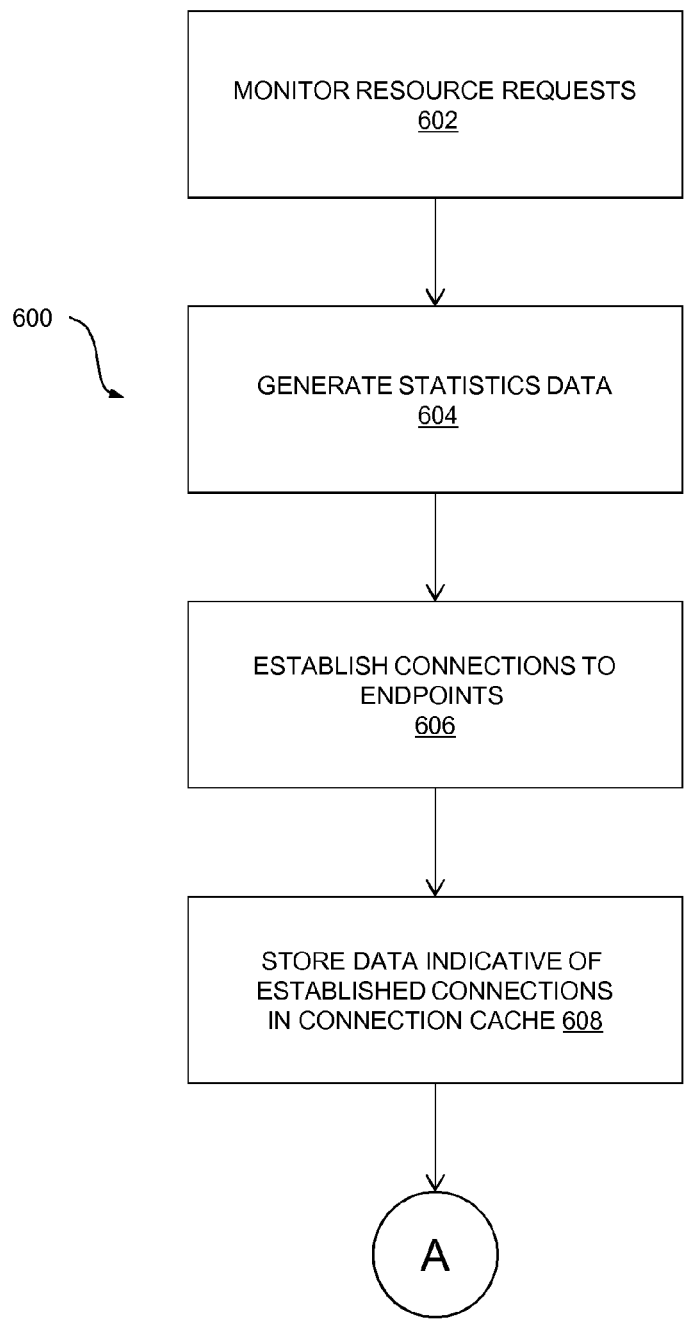
FIGS. 6A-C are flow charts showing a method of maintaining a connection cache according to an embodiment of the invention.
Figure 6B:
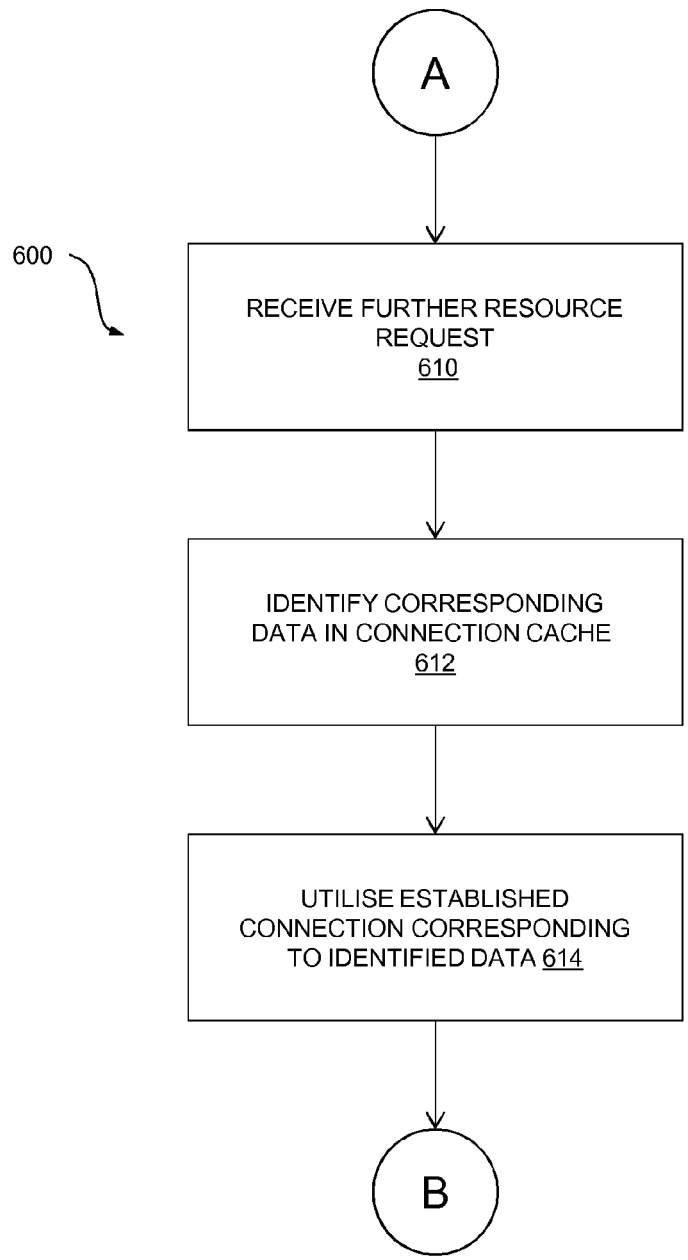
Figure 6C:
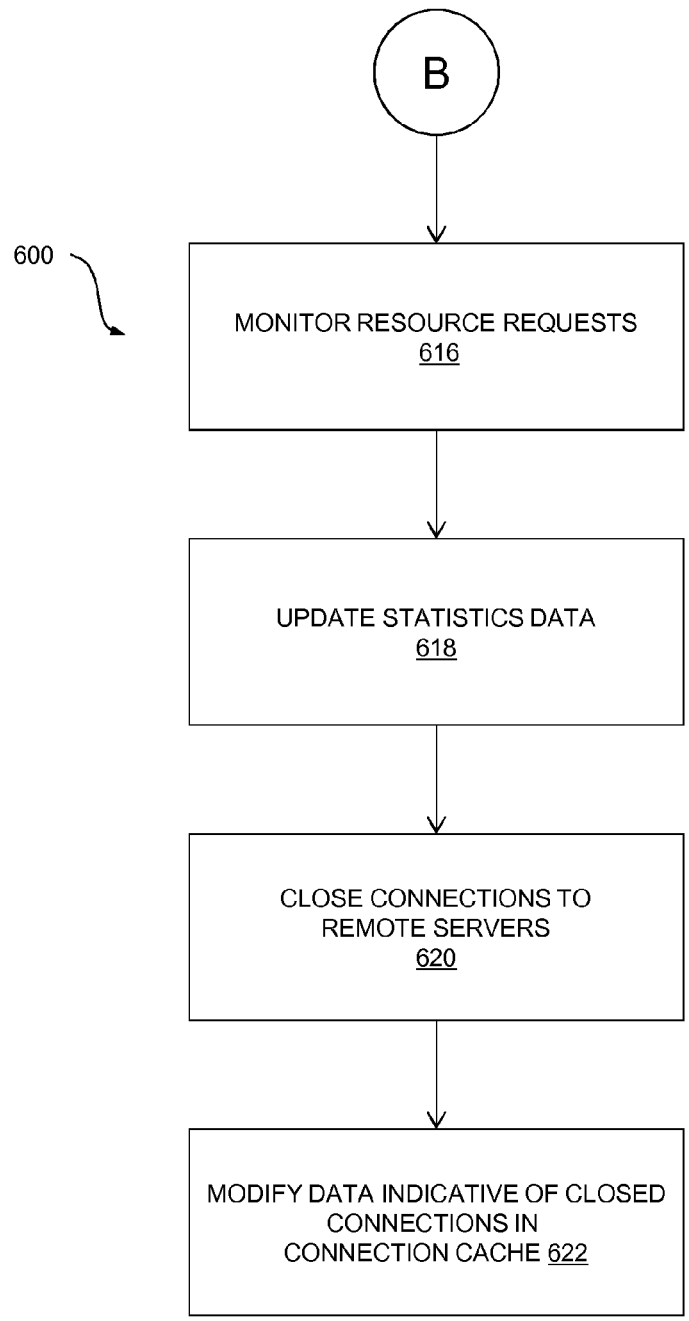

FIGS. 6A-C show a method 600 of maintaining a connection cache according to an embodiment of the invention. With reference to FIG. 6A, in a first step, the proxy server 108 monitors resource requests addressed to the plurality of endpoints associated with origin servers 104 during a first time period [step 602]. Next, the proxy server 108 generates statistics data on the basis of the monitored resource requests [step 604] and then establishes a plurality of connections from the proxy server 108 to a plurality of endpoints associated with a subset of the plurality of origin servers 104, wherein the selected endpoints are determined by the proxy server 108 on the basis of the generated statistics data [step 606]. Once the connections have been established, the proxy server 108 stores data indicative of the plurality of established connections in the connection cache 114, such that the connections are made available for subsequent resource requests [step 608].

With reference to FIG. 6B, once the plurality of new connections have been established and added to the connection cache 114, the proxy server 108 may receive a further resource request from a client device in respect of a resource located at an endpoint associated with one of the origin servers 104 [step 610]. Responsive to the receipt of the further resource request, the proxy server 108 determines whether the connection cache 114 includes an established connection to the indicated endpoint by identifying, from the connection cache, data corresponding to the further resource request [step 612]. If the connection cache includes an appropriate connection to the specified endpoint, the proxy server 108 utilizes that established connection to forward the further resource request [step 614].

As discussed above, in some embodiments the proxy server 108 may "refresh" the connection cache 114 by monitoring resource requests during a further time period. Such a method is shown in FIG. 6C, according to which the proxy server 108 further monitors resource request addressed to the plurality of remote servers during a second time period [step 616] and updates the statistics data on the basis of the further monitoring [step 618]. Next, the proxy server 108 determines that some of the connections stored in the connection cache 114 no longer require caching (i.e. are no longer in the top R popular endpoints according to request frequency) and therefore closes the no longer required connections on the basis of the updated statistics data [step 620]. Finally, the proxy server 108 modifies data indicative of the closed connection in the connection cache such that the closed connections are no longer available for subsequent resource requests from the client devices 102 [step 622]

In an embodiment, the monitoring of resource requests can take place in fixed windows of time (e.g. 5 minutes, 1 hour, 12 hours, or 1 day) to determine the top R popular endpoints. This would result in a dynamic list of the endpoints to which connections are cached. The number, R, of the most popular endpoints could be adjusted in response to various parameters. For example, parameters that may influence the number of endpoints that have cached connections may include bandwidth conditions in the network, resource utilization, time of day, business concerns such as contracts/pay for premium service (i.e cached connections). In an embodiment, the magnitude of the number, R, of the most popular endpoints can be adjusted as a function of the concentration of requests amongst origin servers. For example, if the concentration of requests is relatively high, then the magnitude of R may be reduced so that the connection cache is more focused on the highly popular endpoints. Likewise, if the concentration of requests is more spread out amongst a larger number or origin servers, then the magnitude of R may be increased so that the connection cache covers a larger breadth of endpoints.

Typically, the cache management module 112 is a functional component of the proxy server 108. Alternatively, the cache management module 112 may be embodied in a physically separate device or component which is operationally connected to the proxy server 108.

The above-described embodiments relate generally to HTTP resource requests. However, it will be appreciated that embodiments may be applied to other application level protocols, such as Post Office Protocol (POP), Simple Mail Transfer Protocol (SMTP) and File Transfer Protocol (FTP). In addition, although the connections are referred to herein as TCP connections, other connection protocols may be utilized.

Although the steps in the methods described hereinbefore are shown and described in a particular order, the order of the operations of each method may be altered so that certain operations may be performed in a different order or so that certain operations may be performed, at least in part, concurrently with other operations.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described hereinbefore.

Furthermore, embodiments of the invention can be embodied in the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Figure 7:
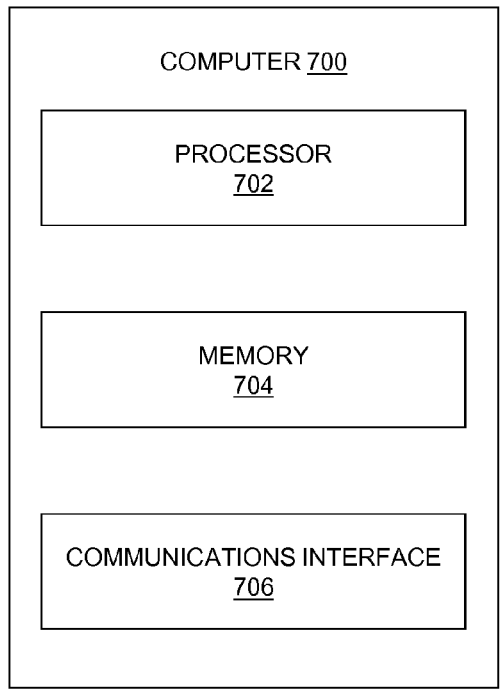
FIG. 7 is a schematic diagram showing a proxy server according to an embodiment of the invention.

The functionality of at least some of the embodiments depicted in FIGS. 1 to 6 is performed by a computer that executes computer readable instructions. FIG. 7 depicts a computer 700 that includes a processor 702, memory 704, and a communications interface 706. The processor 702 may include a multifunction processor and/or an application-specific processor. Examples of processors include the PowerPC™ family of processors by IBM™ and the x86 family of processors by Intel™. The memory 704 within the computer may include, for example, storage medium such as read only memory (ROM), flash memory, RAM, and a large capacity permanent storage device such as a hard disk drive or solid state drive. The communications interface 706 enables communications with other computers in network 706 using, for example, Internet Protocol (IP). The computer executes computer readable instructions stored in the storage medium to implement various tasks as described above.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of maintaining a connection cache at an intermediate server, the connection cache relating to resource requests from a plurality of devices to a plurality of remote servers, the method comprising:
    monitoring resource requests addressed to a plurality of the remote servers during a first time period;
    generating statistics data on the basis of the resource requests monitored during the first time period;
    establishing a plurality of connections from the intermediate server to a first subset of the plurality of remote servers, the first subset being determined on the basis of the generated statistics data, wherein the statistics data indicates a ranking of the plurality of remote servers based on number or rate of connection requests in respect thereof, and the subset of remote servers is selected on the basis of the ranking; and
    storing data indicative of the plurality of established connections in a connection cache, wherein the plurality of connections from the intermediate server to the first subset of the plurality of remote servers comprises a plurality of connections from the intermediate server to a first remote server in the plurality of remote servers, wherein the connection cache comprises a data structure which indicates the plurality of established connections from the intermediate server to the first subset of the plurality of remote servers and a plurality of respective status indicators;
    monitoring resource requests addressed to the plurality of remote servers during a second time period;
    updating the statistics data on the basis of the resource requests monitored during the second time period;
    closing a plurality of connections from the intermediate server to a second subset of the plurality of remote servers, the second subset being determined on the basis of the updated statistics data; and
    modifying the data indicative of the plurality of established connections in the connection cache based on the plurality of closed connections.

2. The method of claim 1, further comprising:
    receiving a further resource request addressed to a particular remote server of the plurality of remote servers;
    identifying, from the connection cache, data corresponding to the further resource request; and
    utilizing whichever established connection corresponds to the identified data to forward the further resource request to the particular remote server.

3. The method of claim 2 further comprising, responsive to receipt of a termination request in respect of the utilized connection, modifying data corresponding to the utilized connection in the connection cache.

4. The method of claim 3, wherein the termination request is received from a device associated with the utilized connection and wherein the data corresponding to the utilized connection is modified to indicate that the utilized connection is available for further resource requests.

5. The method of claim 3, wherein the termination request is received from a remote server associated with the utilized connection and wherein the data corresponding to the utilized connection is modified to indicate that the utilized connection has been closed.

6. The method of claim 1, wherein the resource requests comprise a Hypertext Transfer Protocol (HTTP) request.

7. An intermediate server for maintaining a connection cache, the connection cache relating to resource requests from a plurality of devices to a plurality of remote servers, the intermediate server comprising at least one processor and at least one memory including computer program code, the memory and the computer program code being configured to cause the processor to:
    monitor resource requests received addressed to a plurality of the remote servers during a first time period;
    generate statistics data on the basis of the resource requests monitored during the first time period;
    establish a plurality of connections from the intermediate server to a first subset of the plurality of remote servers, the first subset being determined on the basis of the generated statistics data, wherein the statistics data indicates a ranking of the plurality of remote servers based on number or rate of connection requests in respect thereof, and the subset of remote servers is selected on the basis of the ranking; and
    store data indicative of the plurality of established connections in a connection cache, wherein the plurality of connections from the intermediate server to the subset of the plurality of remote servers comprises a plurality of connections from the intermediate server to a first remote server in the plurality of remote servers, wherein the connection cache comprises a data structure which indicates the plurality of established connections from the intermediate server to the first subset of the plurality of remote servers and a plurality of respective status indicators;
    monitor resource requests addressed to the plurality of remote servers during a second time period;
    update the statistics data on the basis of the resource requests monitored during the second time period;
    close a plurality of connections from the intermediate server to a second subset of the plurality of remote servers, the second subset being determined on the basis of the updated statistics data; and
    modify the data indicative of the plurality of established connections in the connection cache based on the plurality of closed connections.

8. The intermediate server of claim 7, wherein the processor is further configured to:
    receive a further resource request addressed to a particular remote server of the plurality of remote servers;
    identify, from the connection cache, data corresponding to the further resource request; and utilize whichever established connection corresponds to the identified data to forward the further resource request to the particular remote server.

9. The intermediate server of claim 8, wherein the processor is further configured to, responsive to receipt of a termination request in respect of the utilized connection, modify data corresponding to the utilized connection in the connection cache.

10. The intermediate server of claim 9, wherein the termination request is received from a device associated with the utilized connection and wherein the data corresponding to the utilized connection is modified to indicate that the utilized connection is available for further resource requests.

11. The intermediate server of claim 9, wherein the termination request is received from a remote server associated with the utilized connection and wherein the data corresponding to the utilized connection is modified to indicate that the utilized connection has been closed.

12. The intermediate server of claim 7, wherein the resource requests comprise a Hypertext Transfer Protocol (HTTP) request.

13. A computer program product comprising a non-transitory computer-readable storage medium comprising computer-executable instructions which, when executed by a processor, cause a computing device to perform a method of maintaining a connection cache at an intermediate server, the connection cache relating to resource requests from a plurality of devices to a plurality of remote servers, the method comprising:

monitoring resource requests addressed to a plurality of the remote servers during a first time period;

generating statistics data on the basis of the resource requests monitored during the first time period;

establishing a plurality of connections from the intermediate server to a first subset of the plurality of remote servers, the first subset being determined on the basis of the generated statistics data, wherein the statistics data indicates a ranking of the plurality of remote servers based on number or rate of connection requests in respect thereof, and the subset of remote servers is selected on the basis of the ranking; and storing data indicative of the plurality of established connections in a connection cache, wherein the plurality of connections from the intermediate server to the first subset of the plurality of remote servers comprises a plurality of connections from the intermediate server to a first remote server in the plurality of remote servers, wherein the connection cache comprises a data structure which indicates the plurality of established connections from the intermediate server to the first subset of the plurality of remote servers and a plurality of respective status indicators;

monitoring resource requests addressed to the plurality of remote servers during a second time period;

updating the statistics data on the basis of the resource requests monitored during the second time period;

closing a plurality of connections from the intermediate server to a second subset of the plurality of remote servers, the second subset being determined on the basis of the updated statistics data; and modifying the data indicative of the plurality of established connections in the connection cache based on the plurality of closed connections.

* * * * *